(12) United States Patent
Yagita et al.

(10) Patent No.: US 10,065,375 B2
(45) Date of Patent: Sep. 4, 2018

(54) ADDITIVE MANUFACTURING SYSTEM, MODELING-DATA PROVIDING APPARATUS AND PROVIDING METHOD

(71) Applicant: MITSUBISHI HITACHI POWER SYSTEMS, LTD., Kanagawa (JP)

(72) Inventors: Hiroyuki Yagita, Kanagawa (JP); Yui Okada, Kanagawa (JP); Hiroaki Ishikawa, Kanagawa (JP); Jun Hyodo, Kanagawa (JP); Hiroyuki Esashi, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 117 days.

(21) Appl. No.: 15/309,961

(22) PCT Filed: Jun. 3, 2015

(86) PCT No.: PCT/JP2015/066076
§ 371 (c)(1),
(2) Date: Nov. 9, 2016

(87) PCT Pub. No.: WO2015/186750
PCT Pub. Date: Dec. 10, 2015

(65) Prior Publication Data
US 2017/0144380 A1    May 25, 2017

(30) Foreign Application Priority Data

Jun. 4, 2014   (JP) .................................. 2014-115808
Jun. 4, 2014   (JP) .................................. 2014-115809

(51) Int. Cl.
*G06F 19/00*   (2018.01)
*B29C 67/00*   (2017.01)
(Continued)

(52) U.S. Cl.
CPC .......... *B29C 67/0088* (2013.01); *B33Y 50/00* (2014.12); *G05B 19/4099* (2013.01); *G05B 2219/49023* (2013.01)

(58) Field of Classification Search
CPC .. B29C 67/0088; B33Y 50/00; G05B 19/4099
See application file for complete search history.

(56) References Cited

U.S. PATENT DOCUMENTS 9,873,229 B2 *   1/2018   Chun ..................... B29C 64/40
2006/0274370 A1 *  12/2006   Shima ................... G06F 3/1204
358/1.15
(Continued)

FOREIGN PATENT DOCUMENTS

JP   9-286058    11/1997
JP   11-333574   12/1999
(Continued)

OTHER PUBLICATIONS

International Search Report dated Aug. 4, 2015 in International (PCT) Application No. PCT/JP2015/066076.
(Continued)

*Primary Examiner* — Vincent Tran
(74) *Attorney, Agent, or Firm* — Wenderoth, Lind & Ponack, L.L.P.

(57) ABSTRACT

An additive manufacturing system includes an additive manufacturing apparatus and a modeling-data providing apparatus. The modeling-data providing apparatus includes: a dividing unit configured to divide modeling data into n packets of transmission data; and a data transmitting unit configured to transmit the n packets of the transmission data to the additive manufacturing apparatus in series. The data transmitting unit is configured to confirm receipt, by a deletion-signal receiving unit, of a deletion signal indicating deletion of an $i^{th}$ packet of the n packets of the transmission data, and subsequently transmit an $i+1^{th}$ packet of the n (Continued)

packets of the transmission data to the additive manufacturing apparatus.

5 Claims, 6 Drawing Sheets

(51) Int. Cl.
 *B33Y 50/00* (2015.01)
 *G05B 19/4099* (2006.01)

(56) References Cited

U.S. PATENT DOCUMENTS

| | | | | |
|---|---|---|---|---|
| 2009/0113545 | A1* | 4/2009 | Pic | G06F 17/30029 |
| | | | | 726/22 |
| 2013/0258376 | A1* | 10/2013 | Tsuchiya | G03G 15/5025 |
| | | | | 358/1.13 |
| 2014/0058959 | A1* | 2/2014 | Isbjornssund | G06F 21/10 |
| | | | | 705/310 |
| 2014/0136832 | A1* | 5/2014 | Klum | H04L 63/0428 |
| | | | | 713/150 |
| 2015/0057784 | A1* | 2/2015 | Butler | B29C 67/0088 |
| | | | | 700/119 |

FOREIGN PATENT DOCUMENTS

| | | |
|---|---|---|
| JP | 2001-9920 | 1/2001 |
| JP | 2003-186642 | 7/2003 |
| JP | 2003-311463 | 11/2003 |
| JP | 2005-035299 | 2/2005 |
| JP | 2006-137173 | 6/2006 |
| JP | 2006-231409 | 9/2006 |
| JP | 2007-106070 | 4/2007 |
| JP | 2007-145021 | 6/2007 |
| JP | 2008-507412 | 3/2008 |
| JP | 2008-194968 | 8/2008 |
| JP | 2008-302701 | 12/2008 |
| JP | 2009-154176 | 7/2009 |
| JP | 2010-120104 | 6/2010 |
| JP | 2010-207884 | 9/2010 |
| JP | 2010-276491 | 12/2010 |
| JP | 4617573 | 1/2011 |
| JP | 2011-528075 | 11/2011 |
| JP | 2012-86235 | 5/2012 |
| JP | 2012-213970 | 11/2012 |
| WO | 2010/026951 | 3/2010 |

OTHER PUBLICATIONS

International Search Report dated Sep. 1, 2015 in International (PCT) Application No. PCT/JP2015/066080.
Japanese Notice of Allowance dated Jun. 24, 2016 in Japanese Patent Application No. 2014-115808 with English translation.
Japanese Notice of Allowance dated Apr. 22, 2016 in Japanese Patent Application No. 2014-115809 with English translation.
International Preliminary Report on Patentability and Written Opinion of the International Searching Authority dated Dec. 15, 2016 in International (PCT) Application No. PCT/JP2015/066076 with English translation.
International Preliminary Report on Patentability and Written Opinion of the International Searching Authority dated Dec. 15, 2016 in International (PCT) Application No. PCT/JP2015/066080 with English translation.

* cited by examiner

ADDITIVE MANUFACTURING SYSTEM, MODELING-DATA PROVIDING APPARATUS AND PROVIDING METHOD

TECHNICAL FIELD

The present disclosure relates to an additive manufacturing system comprising an additive manufacturing apparatus for producing a three-dimensional (3D) object by laminating a modeling material, and a device for providing modeling data.

BACKGROUND ART

In recent years, an additive manufacturing apparatus for producing a 3D object by laminating a modeling material is attracting attention. Patent Document 1 discloses a method of supporting product manufacture aimed at enabling receipt of products that does not depend on the geographical position of a supplier, let alone order of products by a client.

According to the method of supporting product manufacture disclosed in Patent Document 1, a communication system is provided with a client computer of the client, a manufacturing computer for controlling a manufacturing apparatus for manufacturing products on the basis of manufacture data, and a server computer of a provider who uses the manufacturing apparatus to manufacture and sell products, connected to each other. In the communication system, the server computer transmits to the manufacturing computer the manufacture data for manufacturing products according to an order of the client from the client computer. The manufacturing computer is installed at a location convenient for the client (e.g. the client's house), alongside with the manufacturing apparatus and the client computer. The manufacturing computer receives the manufacture data and operates the manufacturing apparatus to manufacture products according to the order of the client.

CITATION LIST

Patent Literature

Patent Document 1: JP4617573B

SUMMARY

Problems to be Solved

Meanwhile, if modeling data (manufacture data) is to be transmitted to an additive manufacturing apparatus (manufacturing apparatus) as described in Patent Document 1, typically, all of the modeling data corresponding to a 3D object is transmitted at once to an additive manufacturing apparatus, which then produces a 3D object on the basis of the transmitted modeling data.

However, in this case, a situation takes place in which the additive manufacturing apparatus has all of the modeling data corresponding to a 3D object, which raises a risk of the whole modeling data being copied via the additive manufacturing apparatus against the will of a provider of the modeling data.

An object of at least one embodiment of the present invention is to provide an additive manufacturing system, a modeling-data providing apparatus, and a modeling-data providing method, whereby it is possible to suppress duplication of full modeling data corresponding to a 3D object against a provider of the modeling data.

Solution to the Problems (1) An additive manufacturing system according to some embodiments of the present invention comprises: an additive manufacturing apparatus configured to manufacture a 3D object by laminating a modeling material; and a modeling-data providing apparatus configured to provide modeling data to the additive manufacturing apparatus. The modeling-data providing apparatus comprises: a dividing unit configured to divide the modeling data corresponding to the 3D object into n packets of transmission data, where n is a positive integer equal to or greater than two; a data transmitting unit configured to transmit the n packets of the transmission data to the additive manufacturing apparatus in series; and a deletion-signal receiving unit configured to receive a deletion signal indicating deletion of the transmission data from the additive manufacturing apparatus, each time a packet of the transmission data sent by the data transmitting unit is deleted from the additive manufacturing apparatus. The additive manufacturing apparatus comprises: a data receiving unit for receiving each packet of the transmission data transmitted from the data transmitting unit; a modeling unit configured to perform a modeling process on the basis of each packet of the transmission data received by the data receiving unit; a data deleting unit configured to delete each packet of the transmission data each time the modeling unit performs the modeling process on the basis of a packet of the transmission data; and a deletion-signal transmitting unit configured to transmit the deletion signal indicating deletion of a packet of the transmission data to the deletion-signal receiving unit each time the data deleting unit deletes a packet of the transmission data. The data transmitting unit is configured to confirm receipt, by the deletion-signal receiving unit, of the deletion signal indicating deletion of an $i^{th}$ packet of the n packets of the transmission data, and subsequently transmit an $i+1^{th}$ packet of the n packets of the transmission data to the additive manufacturing apparatus, where i is a positive integer less than n.

With the above described additive manufacturing system (1), the data transmitting unit confirms receipt by the deletion-signal receiving unit of a deletion signal indicating deletion of the $i^{th}$ packet of the n packets of the transmission data, and then transmits the $i+1^{th}$ packet of the transmission data to the additive manufacturing apparatus. Accordingly, it is possible to avoid a situation in which the additive manufacturing apparatus has all of the modeling data corresponding to a 3D object at once. Hence, it is possible to reduce the risk of duplication of the whole modeling data against the will of the provider of the modeling data.

(2) In some embodiments, in the above described additive manufacturing system (1), the dividing unit is configured to divide the modeling data into units each of which corresponds to one layer of the modeling material to be laminated.

With the above additive manufacturing system (2), since the dividing unit of the transmitting device divides the modeling data into units each of which corresponds to one layer of the modeling material to be laminated, the modeling data is divided into segments, and thereby it is possible to reduce the risk of duplication of the whole modeling data against the will of the provider of the modeling data even further.

(3) In some embodiments, in the above described additive manufacturing system (1), the dividing unit is configured to divide the modeling data into units each of which corresponds to a plurality of layers of the modeling material to be laminated.

With the above additive manufacturing system (3), since the dividing unit of the transmitting device divides the modeling data into units each of which corresponds to a plurality of layers of the modeling material to be laminated, it is possible to reduce the number of transmission of transmission data per 3D object as compared to the above additive manufacturing system (2).

(4) In some embodiments, in the above described additive manufacturing system (1), the dividing unit is configured to divide the modeling data according to a division limiting condition due to at least one of shape, size, or material of the 3D object.

The position and magnitude of stress to be generated in a produced 3D object, and the deformation amount of the 3D object vary depending on how the modeling data is divided by the modeling-data providing apparatus and transmitted to the additive manufacturing apparatus. Thus, it is possible to suppress breakage of a 3D object by dividing the modeling data with the dividing unit according to a division limiting condition set in view of at least one of the shape, size, or material of the 3D object, as in the above additive manufacturing system (4).

(5) In some embodiments, in the above described additive manufacturing system (4), the dividing unit is configured to divide the modeling data according to the division limiting condition even within a single layer of the modeling material to be laminated.

With the above additive manufacturing system (5), the modeling data is divided according to the division limiting condition even in a single layer of a modeling material to be laminated, and thereby it is possible to reduce the risk of duplication of the whole modeling data against the will of the provider of the modeling data even further, and to suppress breakage of a 3D object.

(6) In some embodiments, in the above described additive manufacturing system (5), the dividing unit is configured to set a boundary plane for division along a longitudinal direction of the layer in a case where the dividing unit divides the modeling data within a single layer of the modeling material to be laminated.

With the above additive manufacturing system (6), the boundary plane for division is set along the longitudinal direction of the layer to be divided, and thereby it is possible to suppress a decrease in the bending strength of the 3D object including the layer as compared to a case in which the boundary plane of division is set along the traverse direction of the layer.

(7) In some embodiments, in the above described additive manufacturing system (5) or (6), a main scanning direction of the modeling unit is set along a longitudinal direction of the layer in a case where the dividing unit divides the modeling data within a single layer of the modeling material to be laminated.

With the above additive manufacturing system (7), the main scanning direction of the modeling unit is set along the longitudinal direction of the layer to be divided, and thereby it is possible to suppress a decrease in the bending strength of the 3D object including the layer.

(8) A modeling-data providing apparatus for providing modeling data to an additive manufacturing apparatus configured to manufacture a 3D object by laminating a modeling material, according to some embodiments of the present invention, comprises: a dividing unit configured to divide modeling data corresponding to the 3D object into n packets of transmission data, where n is a positive integer equal to or greater than two; a data transmitting unit configured to transmit the n packets of the transmission data to the additive manufacturing apparatus in series; and a deletion-signal receiving unit configured to receive a deletion signal indicating deletion of a packet of the transmission data from the additive manufacturing apparatus, each time a packet of the transmission data sent by the data transmitting unit is deleted from the additive manufacturing apparatus. The data transmitting unit is configured to confirm receipt, by the deletion-signal receiving unit, of the deletion signal indicating deletion of an $i^{th}$ packet of the n packets of the transmission data, and subsequently transmit an $i+1^{th}$ packet of the n packets of the transmission data to the additive manufacturing apparatus, where i is a positive integer less than n.

With the above described modeling-data providing apparatus (8), the data transmitting unit confirms receipt by the deletion-signal receiving unit of a deletion signal indicating deletion of the $i^{th}$ packet of the n packets of transmission data, and then transmits the $i+1^{th}$ packet of transmission data to the additive manufacturing apparatus. Accordingly, it is possible to avoid a situation in which the additive manufacturing apparatus has all of the modeling data corresponding to a 3D object at once. Hence, it is possible to reduce the risk of duplication of the whole modeling data via the additive manufacturing apparatus against the will of the provider of the modeling data.

(9) A method of providing modeling data for an additive manufacturing apparatus configured to manufacture a 3D object by laminating a modeling material, according to some embodiments of the present invention, comprises: a dividing step of dividing modeling data corresponding to the 3D object into n packets of transmission data, where n is a positive integer equal to or greater than two; and a data transmitting step of transmitting the n packets of the transmission data to the additive manufacturing apparatus in series. The data transmitting step comprises: an $i^{th}$ transmitting step of transmitting an $i^{th}$ packet of the n packets of the transmission data to the additive manufacturing apparatus, where i is a positive integer less than n; and an $i+1^{th}$ transmitting step of transmitting an $i+1^{th}$ packet of the n packets of the transmission data to the additive manufacturing apparatus after confirming receipt of a deletion signal indicating deletion of the $i^{th}$ packet of the transmission data from the additive manufacturing apparatus.

According to the above described method of providing modeling data (9), in the data transmitting step, receipt of a deletion signal indicating deletion of the $i^{th}$ packet of the n packets of the transmission data is confirmed, and then the $i+1^{th}$ packet of the transmission data is transmitted to the additive manufacturing apparatus. Accordingly, it is possible to avoid a situation in which the additive manufacturing apparatus has all of the modeling data corresponding to a 3D object at once. Hence, it is possible to reduce the risk of duplication of the whole modeling data via the additive manufacturing apparatus against the will of the provider of the modeling data.

(10) In some embodiments, in the above described modeling-data providing apparatus (8), the dividing unit is configured to divide the modeling data into units each of which corresponds to one layer of the modeling material to be laminated.

With the above modeling-data providing apparatus (10), since the modeling data is divided into units each of which corresponds to one layer of the modeling material to be laminated, the modeling data is divided into segments, and thereby it is possible to reduce the risk of duplication of the whole modeling data via the additive manufacturing apparatus against the will of the provider of the modeling data.

(11) In some embodiments, in the above described modeling-data providing apparatus (8), the dividing unit is configured to divide the modeling data into units each of which corresponds to a plurality of layers of the modeling material to be laminated.

With the above modeling-data providing apparatus (11), since the modeling data is divided into units each of which corresponds to a plurality of layers of the modeling material to be laminated, it is possible to reduce the number of transmission of transmission data per 3D object as compared to the above modeling-data providing apparatus (10).

(12) In some embodiments, in the above described modeling-data providing apparatus (8), the dividing unit is configured to divide the modeling data according to a division limiting condition due to at least one of shape, size, or material of the 3D object.

The position and magnitude of stress to be generated in a 3D object, and the deformation amount of the 3D object vary depending on how the modeling data is divided and transmitted. Thus, it is possible to suppress breakage of a 3D object by dividing the modeling data according to a division limiting condition set in view of at least one of the shape, size, or material of the 3D object before transmission, as in the above modeling-data providing apparatus (12).

(13) In some embodiments, in the above described modeling-data providing apparatus (12), the dividing unit is configured to divide the modeling data according to the division limiting condition even within a single layer of the modeling material to be laminated.

With the above modeling-data transmitting apparatus (13), it is possible to reduce the risk of duplication of the whole modeling data against the will of the provider of the modeling data even further, and to suppress breakage of a 3D object.

(14) In some embodiments, in the above additive manufacturing system (13), the dividing unit is configured to set a boundary plane for division along a longitudinal direction of the layer in a case where the dividing unit divides the modeling data within a single layer of the modeling material to be laminated.

With the above additive manufacturing system (14), the boundary plane for division is set along the longitudinal direction of the layer to be divided, and thereby it is possible to suppress a decrease in the bending strength of the 3D object including the layer as compared to a case in which the boundary plane of division is set along the traverse direction of the layer.

(15) In some embodiments, in the above method of providing modeling-data (9), in the dividing step, the modeling data is divided into units each of which corresponds to one layer of the modeling material to be laminated.

According to the above method of providing modeling-data (15), since the modeling data is divided into units each of which corresponds to one layer of the modeling material to be laminated, the modeling data is divided into segments, and thereby it is possible to reduce the risk of duplication of the whole modeling data via the additive manufacturing apparatus against the will of the provider of the modeling data even further.

(16) In some embodiments, in the above method of providing modeling-data (9), in the dividing step, the modeling data is divided into units each of which corresponds to a plurality of layers of the modeling material to be laminated.

According to the above method of providing modeling data (16), since the modeling data is divided into units each of which corresponds to a plurality of layers of the modeling material to be laminated, it is possible to reduce the number of transmission of the transmission data per 3D object as compared to the above method of providing modeling data (15).

(17) In some embodiments, in the above method of providing modeling-data (9), in the dividing step, the modeling data is divided according to a division limiting condition due to at least one of shape, size, or material of the 3D object.

The position and magnitude of stress to be generated in a 3D object, and the deformation amount of the 3D object vary depending on how the modeling data is divided and transmitted. Thus, it is possible to suppress breakage of a 3D object by dividing the modeling data according to a division limiting condition set in view of at least one of the shape, size, or material of the 3D object, as in the above method of providing modeling data (17).

(18) In some embodiments, in the above method of providing modeling-data (17), in the dividing step, the modeling data is divided according to the division limiting condition even within a single layer of the modeling material to be laminated.

According to the above method of providing modeling data (18), it is possible to reduce the risk of duplication of the whole modeling data against the will of the provider of the modeling data even further, and to suppress breakage of a 3D object.

(19) In some embodiments, in the above method of providing modeling-data (18), in the dividing step, a boundary plane for division is set along a longitudinal direction of the layer in a case where the dividing unit divides the modeling data within a single layer of the modeling material to be laminated.

According to the above method of providing modeling data (19), the boundary plane for division is set along the longitudinal direction of the layer to be divided, and thereby it is possible to suppress a decrease in the bending strength of the 3D object including the layer as compared to a case in which the boundary plane of division is set along the traverse direction of the layer.

Advantageous Effects

According to at least one embodiment of the present invention, it is possible to reduce the risk of duplication of the whole modeling data corresponding to a 3D object against the will of the provider of the modeling data.

DETAILED DESCRIPTION

Embodiments of the present invention will now be described in detail with reference to the accompanying drawings. It should be noted that, unless otherwise particularly specified, the sizes, materials, shapes, and relative arrangement or the like of constituent components described in these embodiments are not intended to limit the scope of this invention.

Figure 1:
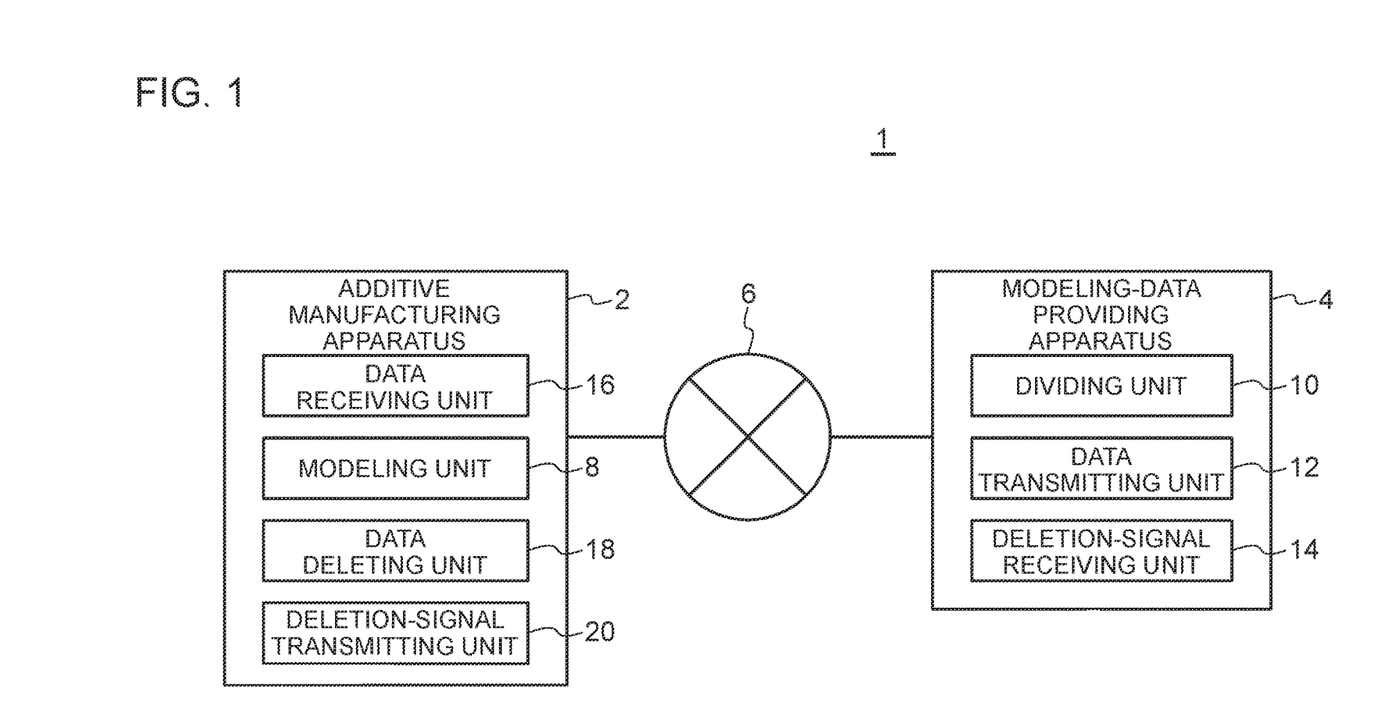
FIG. 1 is a schematic overall diagram of an additive manufacturing system according to some embodiments.

FIG. 1 is a schematic overall diagram of an additive manufacturing system 1 according to some embodiments. The additive manufacturing system 1 includes an additive manufacturing apparatus 2 for manufacturing a 3D object by laminating a modeling material, and a modeling-data providing apparatus 4 for providing the additive manufacturing apparatus 2 with modeling data. The additive manufacturing apparatus 2 and the modeling-data providing apparatus 4 are configured to be communicable with each other via a network 6.

The additive manufacturing apparatus 2 includes a modeling unit 8 for modeling by the "additive layer manufacturing" process, in which a modeling material is stacked in layers. More specifically, there are several types of additive layer manufacturing process, including the ink-jet type of injecting molten synthetic resin or the like into layers, the light-polymerization type of curing photo-curable resin with UV or the like into layers, the fused-deposition modeling type of melting and forming a thermoplastic resin such as ABS resin and PLA resin into layers, the selective laser sintering type of sintering layers of powdered material with high-power laser beam or the like, and the sheet lamination type of laminating sheets.

The modeling-data providing apparatus 4 includes a dividing unit 10 for dividing modeling data corresponding to a 3D object into n packets of transmission data (herein, n is a positive integer equal to or greater than two), a data transmitting unit 12 for transmitting the n packets of transmission data to the additive manufacturing apparatus 2 in series, and a deletion-signal receiving unit 14 for receiving a deletion signal described below from the additive manufacturing apparatus 2.

The additive manufacturing apparatus 2 includes a data receiving unit 16 for receiving each packet of transmission data transmitted from the data transmitting unit 12. The modeling unit 8 is configured to perform modeling on the basis of each packet of transmission data received by the data receiving unit 16.

The additive manufacturing apparatus 2 further includes a data deleting unit 18 and a deletion-signal transmitting unit 20. The data deleting unit 18 is configured to delete each packet of transmission data each time the modeling unit 8 performs modeling on the basis of a packet of transmission data. The deletion-signal transmitting unit 20 is configured to transmit a deletion signal which indicates that a packet of transmission data has been deleted to the deletion-signal receiving unit 14 each time the data deleting unit 18 deletes a packet of transmission data.

Figure 2:
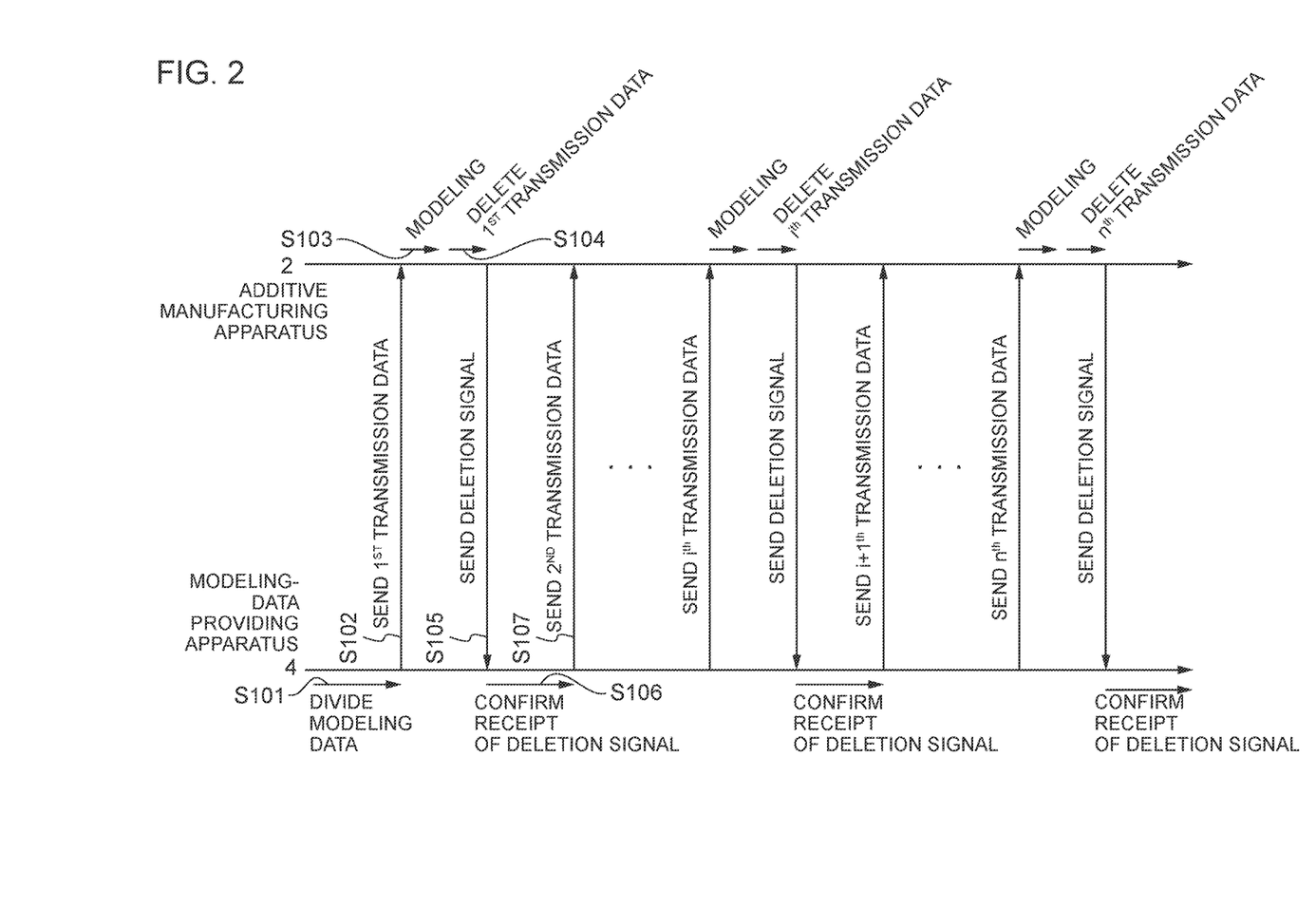
FIG. 2 is a diagram of an example of the operation sequence of an additive manufacturing apparatus and a modeling-data providing apparatus of the additive manufacturing system depicted in FIG. 1.

FIG. 2 is a diagram of an example of the operation sequence of the additive manufacturing apparatus 2 and the modeling-data providing apparatus 4 of the additive manufacturing system 1 depicted in FIG. 1.

The additive manufacturing apparatus 2 and the modeling-data providing apparatus 4 depicted in FIG. 2 operate as follows. In S101, the dividing unit 10 divides modeling data corresponding to a 3D object into n packets of transmission data. In S102, the data transmitting unit 12 transmits the first transmission data of the n packets of transmission data to the data receiving unit 16 of the additive manufacturing apparatus 2. In S103, the modeling unit 8 performs modeling (lamination of a modeling material) on the basis of the first transmission data. In S104, the data deleting unit 18 deletes the first transmission data. In S105, the deletion-signal transmitting unit 20 transmits a deletion signal indicating that the first transmission data has been deleted to the deletion-signal receiving unit 14. In S106, the data transmitting unit 12 confirms receipt of the deletion signal indicating deletion of the first transmission data by the deletion-signal receiving unit 14. In S107, on the condition that receipt of the deletion signal is confirmed in S106, the data transmitting unit 12 transmits the second transmission data to the data receiving unit 16. The same operation is repeated until the deletion-signal receiving unit 14 confirms a deletion signal indicating that the $n^{th}$ packet of transmission data has been deleted, and the additive manufacturing system 1 completes a modeling operation.

As described above, the data transmitting unit 12 confirms receipt by the deletion-signal receiving unit 14 of a deletion signal indicating deletion of the $i^{th}$ packet (herein, i is a positive integer less than n) of transmission data (the $i^{th}$ packet of transmission data) of the n packets of transmission data, and then transmits the $i+1^{th}$ packets of the n packets of the transmission data (the $i+1^{th}$ packet of the transmission data) to the data receiving unit 16 of the additive manufacturing apparatus 2. Accordingly, it is possible to avoid a situation in which the additive manufacturing apparatus 2 has all of the modeling data corresponding to a 3D object at once. Therefore, it is possible to reduce the risk of duplication of the whole modeling data against the will of the provider of the modeling data.

Next, the process of dividing the modeling data with the dividing unit 10 depicted in FIG. 1 according to some embodiments will be described with reference to FIGS. 3 to 5.

Figure 3:
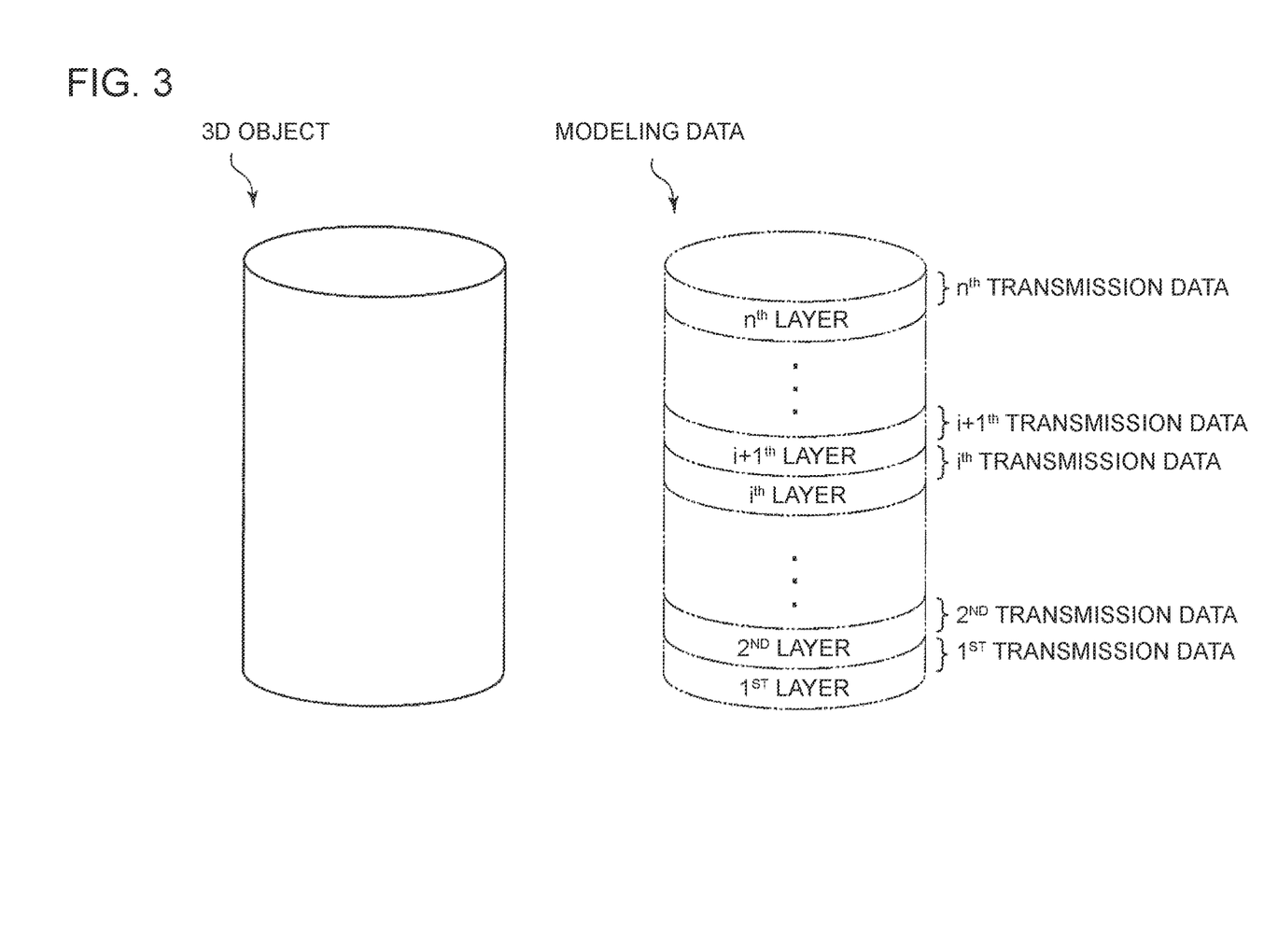
FIG. 3 is a schematic diagram for describing a method of dividing modeling data according to some embodiments.

FIG. 3 is a diagram for describing a method of dividing modeling data according to some embodiments. As depicted in FIG. 3, the dividing unit 10 according to some embodiments is configured to divide the modeling data corresponding to a 3D object into units each of which corresponds to a single layer of a modeling material to be laminated. Specifically, the dividing unit 10 divides the modeling data into n packets so that each packet corresponds to one of the layers that make up a 3D object (so that the $i^{th}$ packet of the transmission data corresponds to the $i^{th}$ layer of a 3D object). In this case, the data transmitting unit 12 confirms receipt by the deletion-signal receiving unit 14 of a deletion signal indicating deletion of the $i^{th}$ packet of the transmission data corresponding to the $i^{th}$ layer of a 3D object, and then transmits the $i+1^{th}$ packet of the transmission data corresponding to the $i+1^{th}$ layer of the 3D object to the data receiving unit 16 of the additive manufacturing apparatus 2. Accordingly, the modeling data is divided into segments, and thereby it is possible to reduce the risk of duplication of the whole modeling data against the will of the provider of the modeling data even further.

Figure 4:
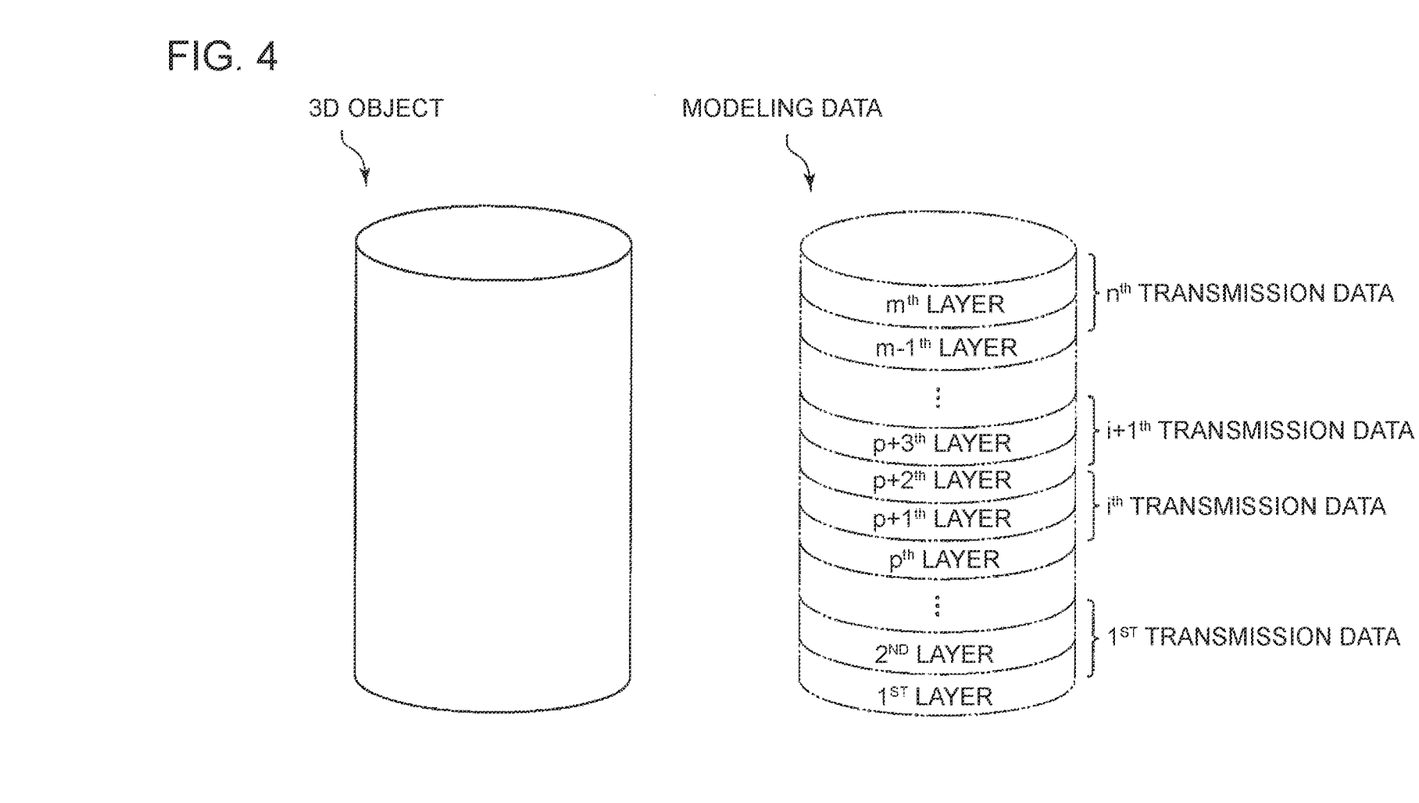
FIG. 4 is a schematic diagram for describing a method of dividing modeling data according to some embodiments.

FIG. 4 is a diagram for describing a method of dividing modeling data according to some embodiments. As depicted in FIG. 4, the dividing unit 10 according to some embodiments is configured to divide the modeling data corresponding to a 3D object into units each of which corresponds to a plurality of layers of a modeling material to be laminated (in FIG. 4, each unit corresponds to two layers). Specifically, the dividing unit 10 divides the modeling data into n packets of transmission data so that each packet corresponds to more than one of the layers that make up a 3D object (so that, in FIG. 4, the $i^{th}$ packet of transmission data corresponds to the $p^{th}$ layer and the $p+1^{th}$ layer of a 3D object). Herein, p is a positive integer equal to 2i−1. Furthermore, the $m^{th}$ layer, which is the top layer in FIG. 4, equals to the $2n^{th}$ layer. In the example of the dividing process depicted in FIG. 4, the data transmitting unit 12 confirms receipt by the deletion-signal receiving unit 14 of a deletion signal indicating deletion of the $i^{th}$ packet of the transmission data corresponding to the $p^{th}$ layer and the $p+1^{th}$ layer of a 3D object, and then transmits the $i+1^{th}$ packet of the transmission data corresponding to the $p+2^{th}$ layer and the p+3 layer of the 3D object to the data receiving unit 16 of the additive manufacturing apparatus 2.

As described above, modeling data corresponding to a 3D object is divided into units each corresponding to a plurality of layers of a modeling material to be laminated, and thereby it is possible to reduce the number of transmission of transmission data per 3D object as compared to a case in which the modeling data is divided into units of a single layer.

Furthermore, the modeling data corresponding to a 3D object may include packets of modeling data each corresponding to a single layer, and packets of modeling data each corresponding to more than one layers, of a modeling material to be laminated.

Figure 5:
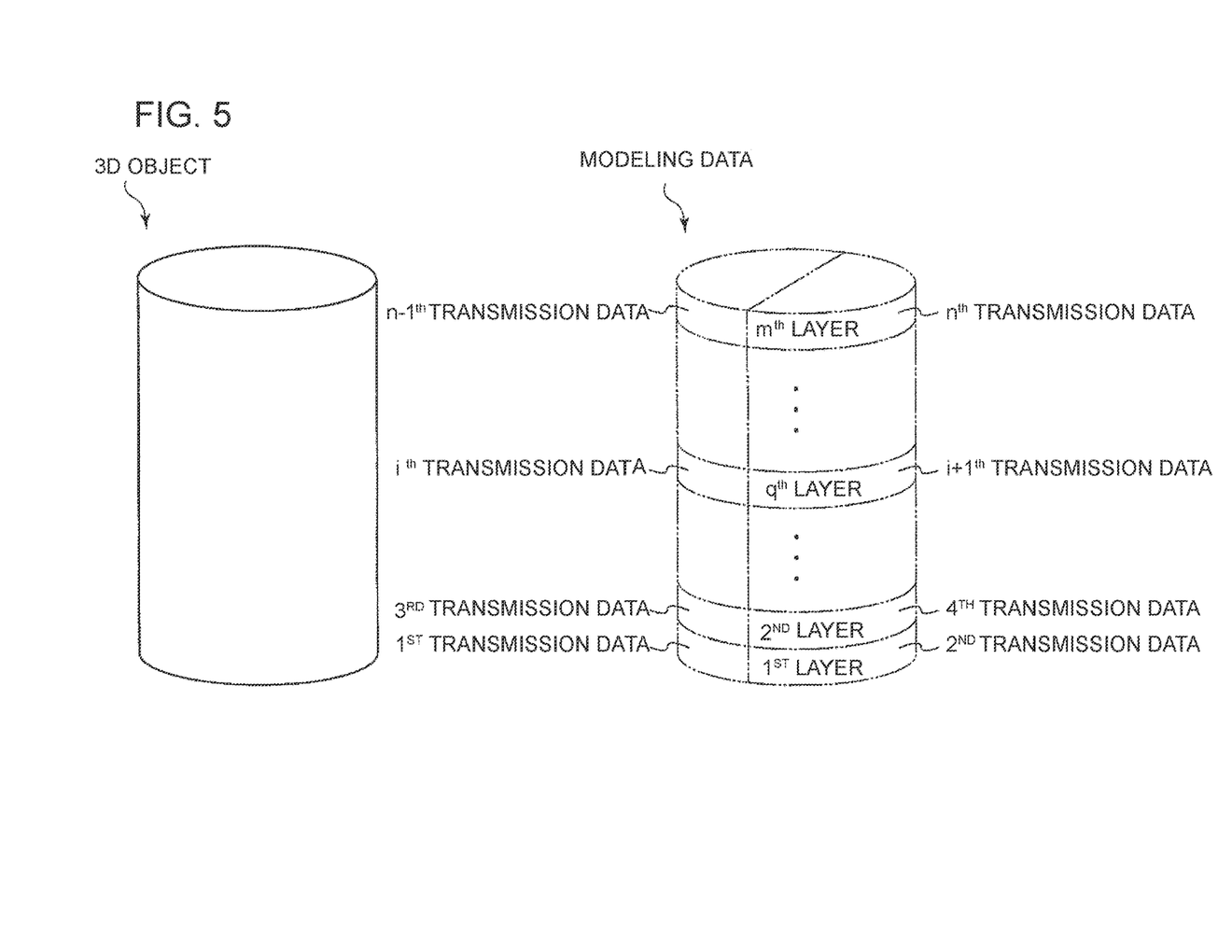
FIG. 5 is a schematic diagram for describing a method of dividing modeling data according to some embodiments.

FIG. 5 is a diagram for describing a method of dividing modeling data according to some embodiments. The dividing unit 10 according to some embodiments is configured to divide the modeling data corresponding to a 3D object according to a limiting condition due to at least one of the shape, size, or material of the 3D object. For instance, a limiting condition set in view of at least one of the shape, size, or material of a 3D object, is imposed on a heat input amount in modeling (heat amount applied to a modeling material according to the above described types of modeling process) per each packet of transmission data during modeling by the modeling unit 8 based on each packet of transmission data. In the dividing process depicted in FIG. 5, the dividing unit 10 is configured to divide the modeling data according to the limiting condition even in a single layer of a modeling material to be laminated, so that a heat input amount for modeling per each packet of transmission data falls within a predetermined range. In the example depicted in FIG. 5, the dividing unit 10 divides the modeling data so that two packets of transmission data are distributed per layer. In this case, the data transmitting unit 12 confirms receipt by the deletion-signal receiving unit 14 of a deletion signal indicating deletion of the $i^{th}$ packet of the transmission data corresponding to a part of the $q^{th}$ layer of a 3D object, and then transmits the $i+1^{th}$ packet of the transmission data corresponding to the remaining part of the $q^{th}$ layer to the data receiving unit 16 of the additive manufacturing apparatus 2.

Figure 6A:
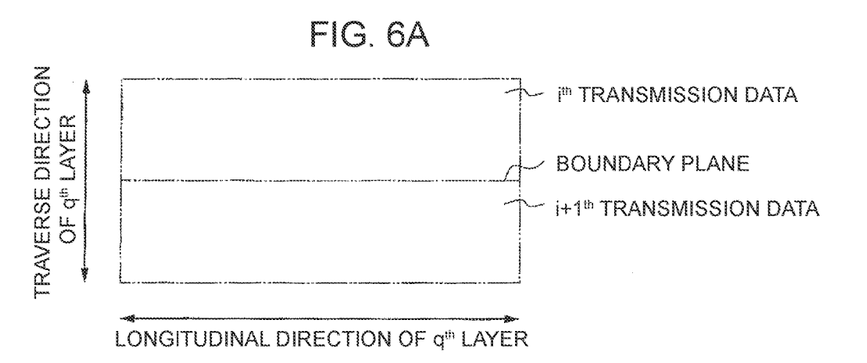
FIG. 6A is a diagram for describing a method of dividing modeling data within a single layer according to some embodiments.
Figure 6B:
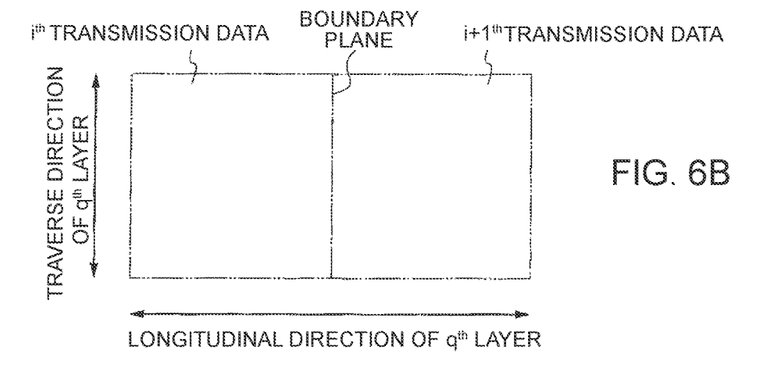
FIG. 6B is a diagram for describing a method of dividing modeling data within a single layer according to some embodiments.
Figure 6C:
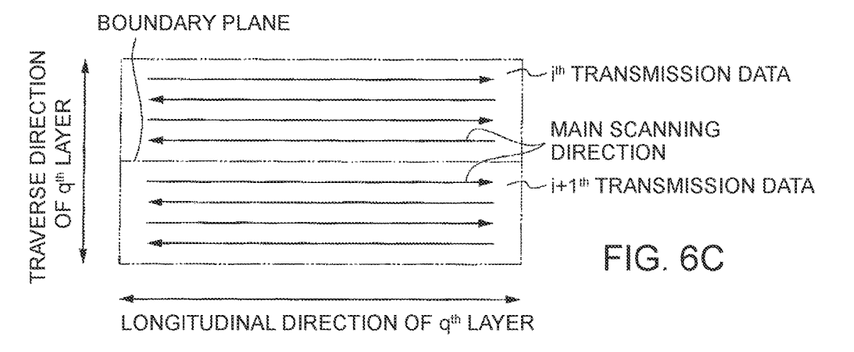
FIG. 6C is a diagram for describing a relationship, within a single layer of modeling data, between the longitudinal direction of the layer and the main scanning direction of a modeling unit. according to some embodiments.

Furthermore, if the modeling data is to be divided so that two packets of transmission data are distributed per layer to keep a heat input amount within a predetermined range, a boundary plane for division is set along the longitudinal direction of the layer of the 3D object. Specifically, as depicted in FIG. 6A, if the modeling data is to be divided within a single layer of a modeling material to be laminated, the dividing unit 10 sets a boundary plane for division along the longitudinal direction of the layer (a plane corresponding to the boundary between the $i^{th}$ packet of the transmission data and the $i+1^{th}$ packet of the transmission data distributed per layer). Furthermore, if the dividing unit 10 is to divide the modeling data within a single layer, the main scanning direction of the modeling unit 8 (typically, a printer head) is set along the longitudinal direction of the layer, as depicted in FIG. 6C.

In the above described additive manufacturing system 1, if a modeling material is to be laminated to produce a 3D object on the basis of each of a plurality of packets of transmission data, the position and magnitude of stress to be generated in a produced 3D object, and the deformation amount of the 3D object vary depending on how the modeling data corresponding to the 3D object is divided by the modeling-data providing apparatus 4 and transmitted to the additive manufacturing apparatus 2. Thus, it is possible to suppress breakage of a 3D object by dividing the modeling data with the dividing unit 10 according to a limiting condition due to at least one of the shape, size, or material of the 3D object. Furthermore, as described above, the dividing unit 10 is configured to divide the modeling data according to the limiting condition even in a single layer of a modeling material to be laminated, and thereby it is possible to reduce the risk of duplication of the whole modeling data against the will of the provider of the modeling data even further, and to suppress breakage of a 3D object. Furthermore, the boundary plane for division is set along the longitudinal direction of the layer of the 3D object, and thereby it is possible to suppress a decrease in the bending strength of the 3D object including the layer as compared to a case in which the boundary plane of division is set along the traverse direction of the layer (see FIG. 6B). Furthermore, the main scanning direction of the modeling unit 8 is set along the longitudinal direction of the layer, and thereby it is possible to suppress a decrease in the bending strength of the 3D object including the layer even further.

DESCRIPTION OF REFERENCE NUMERAL

1 Additive manufacturing system
2 Additive manufacturing apparatus
4 Modeling-data providing apparatus
6 Network
8 Modeling unit
10 Dividing unit
12 Data transmitting unit
14 Deletion-signal receiving unit
16 Data receiving unit
18 Data deleting unit
20 Deletion-signal transmitting unit

The invention claimed is:
1. An additive manufacturing system, comprising:
   an additive manufacturing apparatus configured to manufacture a 3D object by laminating a modeling material; and
   a modeling-data providing apparatus configured to provide modeling data to the additive manufacturing apparatus,
   wherein the modeling-data providing apparatus comprises:

a dividing unit configured to divide the modeling data corresponding to the 3D object into n packets of transmission data, where n is a positive integer equal to or greater than two;

a data transmitting unit configured to transmit the n packets of the transmission data to the additive manufacturing apparatus in series; and a deletion-signal receiving unit configured to receive a deletion signal indicating deletion of the transmission data from the additive manufacturing apparatus, each time a packet of the transmission data sent by the data transmitting unit is deleted from the additive manufacturing apparatus, wherein the additive manufacturing apparatus comprises:

a data receiving unit for receiving each packet of the transmission data transmitted from the data transmitting unit;

a modeling unit configured to perform a modeling process on the basis of each packet of the transmission data received by the data receiving unit;

a data deleting unit configured to delete each packet of the transmission data each time the modeling unit performs the modeling process on the basis of a packet of the transmission data; and a deletion-signal transmitting unit configured to transmit the deletion signal indicating deletion of a packet of the transmission data to the deletion-signal receiving unit each time the data deleting unit deletes a packet of the transmission data, and wherein the data transmitting unit is configured to confirm receipt, by the deletion-signal receiving unit, of the deletion signal indicating deletion of an $i^{th}$ packet of the n packets of the transmission data, and subsequently transmit an $i+1^{th}$ packet of the n packets of the transmission data to the additive manufacturing apparatus, where i is a positive integer less than n, wherein the dividing unit is configured to divide the modeling data according to a division limiting condition due to at least one of shape, size, or material of the 3D object, wherein the dividing unit is configured to divide the modeling data according to the division limiting condition even within a single layer of the modeling material to be laminated, and wherein the dividing unit is configured to set a boundary plane for division along a longitudinal direction of the layer and a main scanning direction of the modeling unit is set along a longitudinal direction of the layer, in a case where the dividing unit divides the modeling data within a single layer of the modeling material to be laminated.

2. The additive manufacturing system according to claim 1, wherein the dividing unit is configured to divide the modeling data into units each of which corresponds to one layer of the modeling material to be laminated.

3. The additive manufacturing system according to claim 1, wherein the dividing unit is configured to divide the modeling data into units each of which corresponds to a plurality of layers of the modeling material to be laminated.

4. A modeling-data providing apparatus for providing modeling data to an additive manufacturing apparatus configured to manufacture a 3D object by laminating a modeling material, the modeling-data providing apparatus comprising:

a dividing unit configured to divide modeling data corresponding to the 3D object into n packets of transmission data, where n is a positive integer equal to or greater than two;

a data transmitting unit configured to transmit the n packets of the transmission data to the additive manufacturing apparatus in series; and a deletion-signal receiving unit configured to receive a deletion signal indicating deletion of a packet of the transmission data from the additive manufacturing apparatus, each time a packet of the transmission data sent by the data transmitting unit is deleted from the additive manufacturing apparatus, wherein the data transmitting unit is configured to confirm receipt, by the deletion-signal receiving unit, of the deletion signal indicating deletion of an $i^{th}$ packet of the n packets of the transmission data, and subsequently transmit an $i+1^{th}$ packet of the n packets of the transmission data to the additive manufacturing apparatus, where i is a positive integer less than n, wherein the dividing unit is configured to divide the modeling data according to a division limiting condition due to at least one of shape, size, or material of the 3D object, wherein the dividing unit is configured to divide the modeling data according to the division limiting condition even within a single layer of the modeling material to be laminated, and wherein the dividing unit is configured to set a boundary plane for division along a longitudinal direction of the layer, and a main scanning direction of the modeling unit is set along a longitudinal direction of the layer in a case where the dividing unit divides the modeling data within a single layer of the modeling material to be laminated.

5. A method of providing modeling data for an additive manufacturing apparatus configured to manufacture a 3D object by laminating a modeling material, the method at least comprising:

a dividing step of dividing modeling data corresponding to the 3D object into n packets of transmission data, where n is a positive integer equal to or greater than two; and a data transmitting step of transmitting the n packets of the transmission data to the additive manufacturing apparatus in series, wherein the data transmitting step comprises:

an $i^{th}$ transmitting step of transmitting an $i^{th}$ packet of the n packets of the transmission data to the additive manufacturing apparatus, where i is a positive integer less than n; and an $i+1^{th}$ transmitting step of transmitting an $i+1^{th}$ packet of the n packets of the transmission data to the additive manufacturing apparatus after confirming receipt of a deletion signal indicating deletion of the $i^{th}$ packet of the transmission data from the additive manufacturing apparatus, wherein the dividing step includes dividing the modeling data according to a division limiting condition due to at least one of shape, size, or material of the 3D object, wherein the dividing step includes dividing the modeling data according to the division limiting condition even within a single layer of the modeling material to be laminated, wherein the dividing step includes setting a boundary plane for division along a longitudinal direction of the layer and setting a main scanning direction of the modeling unit along a longitudinal direction of the layer in a case where the modeling data is to be divided within a single layer of the modeling material to be laminated.

\* \* \* \* \*